(12) United States Patent
Tsai

(10) Patent No.: US 9,126,333 B2
(45) Date of Patent: Sep. 8, 2015

(54) ROBOT JOINT AND ROBOT ARM USING THE SAME

(71) Applicant: DELTA ELECTRONICS, INC., Taoyuan Hsien (TW)

(72) Inventor: Ching-Hsiung Tsai, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 258 days.

(21) Appl. No.: 13/860,811

(22) Filed: Apr. 11, 2013

(65) Prior Publication Data

US 2014/0107837 A1    Apr. 17, 2014

(30) Foreign Application Priority Data

Oct. 15, 2012  (TW) .............................. 101137863 A

(51) Int. Cl.
| | |
|---|---|
| G06F 19/00 | (2011.01) |
| B25J 9/16 | (2006.01) |
| B25J 17/00 | (2006.01) |
| B25J 9/10 | (2006.01) |
| H02K 7/116 | (2006.01) |
| H02P 1/00 | (2006.01) |
| H02K 16/00 | (2006.01) |

(52) U.S. Cl.
CPC ................ B25J 9/1633 (2013.01); B25J 9/102 (2013.01); B25J 17/00 (2013.01); H02K 7/116 (2013.01); H02K 16/00 (2013.01); H02P 1/00 (2013.01)

(58) Field of Classification Search
CPC ......... G06F 19/00; B62D 57/032; B25J 9/102

USPC ......... 700/245, 247, 250, 252, 253, 256, 257, 700/900; 318/568.11, 568.2, 34, 45, 46; 901/19, 27, 28, 29, 23, 25, 26, 36; 74/469, 479.01, 490.01, 490.05, 74/490.03, 640, 665 R, 665 L
See application file for complete search history.

(56) References Cited

U.S. PATENT DOCUMENTS

| | | | | | |
|---|---|---|---|---|---|
| 5,012,169 | A | * | 4/1991 | Ono et al. ................ | 318/568.22 |
| 5,293,107 | A | * | 3/1994 | Akeel ....................... | 318/568.11 |
| 5,319,294 | A | * | 6/1994 | Ohto et al. ............... | 318/568.22 |
| 5,386,741 | A | * | 2/1995 | Rennex ...................... | 74/490.05 |
| 6,477,918 | B2 | * | 11/2002 | Sakamoto ..................... | 74/640 |
| 8,760,100 | B2 | * | 6/2014 | Shafer et al. .................. | 318/434 |

(Continued)

FOREIGN PATENT DOCUMENTS

| | | |
|---|---|---|
| CN | 101134312 | 12/2010 |
| TW | 404860 | 9/2000 |
| WO | WO2011000288 | 1/2011 |

*Primary Examiner* — Dalena Tran
*Assistant Examiner* — Jaime Figueroa
(74) *Attorney, Agent, or Firm* — Lowe Hauptman & Ham, LLP

(57) ABSTRACT

A robot joint utilized in a robot arm is disclosed. The robot joint includes a hollow shaft, a first gear, plural motors, plural second gears, an encoder, and a digital signal processor. The first gear is fixed on the hollow shaft. The motors are arranged surrounding the hollow shaft. Each of the motors has a rotating shaft. The second gears are fixed on the rotating shaft and are engaged with the first gear, so that the hollow shaft can be rotated with the second gears driven by the motors. The encoder is disposed at a side of one of the motors opposite to the second gears. The signal detected by the encoder is sent to the digital signal processor for driving the motors. A robot arm using the robot joint is also disclosed.

12 Claims, 10 Drawing Sheets

(56) References Cited

U.S. PATENT DOCUMENTS

| | | | |
|---|---|---|---|
| 2002/0156399 A1* | 10/2002 | Kanderian et al. | 600/587 |
| 2009/0195198 A1* | 8/2009 | Lee | 318/400.11 |
| 2010/0259057 A1* | 10/2010 | Madhani | 294/106 |
| 2011/0254481 A1* | 10/2011 | Chen et al. | 318/400.13 |
| 2012/0089254 A1* | 4/2012 | Shafer et al. | 700/258 |
| 2013/0174680 A1* | 7/2013 | Mihara | 74/98 |
| 2013/0238123 A1* | 9/2013 | Mihara | 700/245 |

* cited by examiner

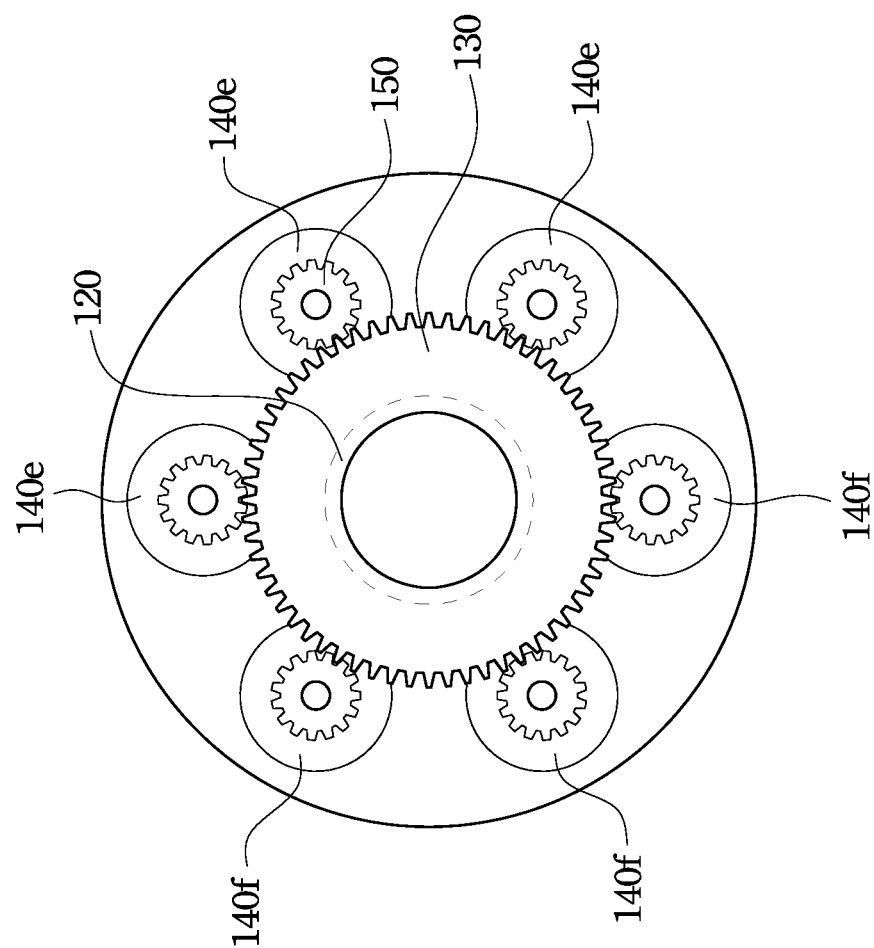

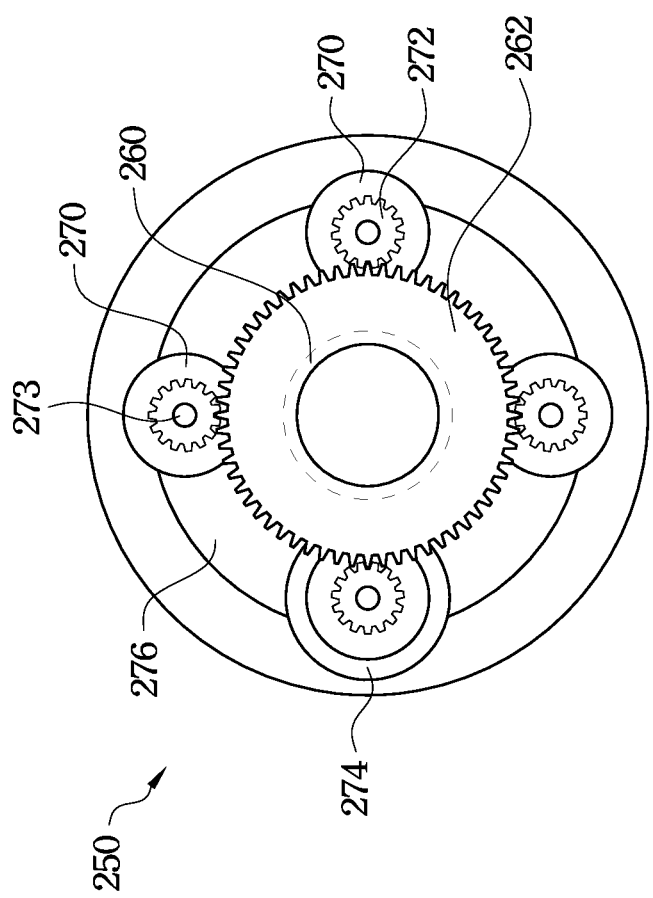

ROBOT JOINT AND ROBOT ARM USING THE SAME

RELATED APPLICATIONS

This application claims priority to Taiwan Application Serial Number 101137863, filed Oct. 15, 2012, which is herein incorporated by reference.

BACKGROUND

1. Field of Invention

The invention relates to a robot joint, more particularly relates to a robot joint applied in a robot arm.

2. Description of Related Art

A robot arm is an automatic control equipment which can simulate functions of a human arm and can complete various operations. Such a robot system is connected through various robot joints and is enabled to motion on a plane surface or in a three-dimensional space, or is enabled to move through linear displacement. The structure of the robot system consists of a robot main body, a controller, a server mechanism and an inductor, and a certain designated actions can be set through programming according to operating requirements. For example, the robot arm is moved to a fixed position as driven by the server mechanism, performs a clamping action, and then precisely feeds back information of the action to a programmable logic controller.

The essential aim of the robot arm is mostly completing actions of wrists and hands, and after operating sequences are inputted into the controller, correct and regular operations can be completed repeatedly. Ever since technology of robot arm starts to develop, the robot arm becomes the automatic robot equipment having the most widely application range, as it were. Many complex and heavy works of the industry, such as installation, transportation, spray painting and welding, all can be operated by the robot arm instead of manual work, which significantly improves operation efficiency and labor cost. Multi-shaft robot arm should be designed to have a hollow-type robot joint, due to the complex conductor arrangement structure thereof and for the requirement of light weight. The existing hollow-type robot joint is mostly designed as being combined by circular structures. Moreover, since each robot arm have a different dimension, different components can not use a common robot arm and thus the cost cannot be reduced.

SUMMARY

Therefore, the invention provides a novel hollow-type robot joint for requirements of robot arms with different dimensions, to effectively reduce arrangement space of the robot arm.

According to an aspect of the invention, a robot joint utilized in a robot arm is provided. The robot joint includes a hollow shaft, a first gear, plural motors, plural second gears, an encoder and a digital signal processor. The first gear is fixed on the hollow shaft. The motors are arranged surrounding the hollow shaft. Each of the motors has a rotating shaft. The second gears are fixed on the rotating shaft and are engaged with the first gear, so that the hollow shaft can be rotated with the second gears driven by the motors. The encoder is disposed at a side of one of the motors opposite to the second gears. The signal detected by the encoder is sent to the digital signal processor for driving the motors. The encoder and the digital signal processor are disposed on the same plane surface.

In one or more embodiments of the invention, the motors can all output power positively at the same time, or all output power negatively at the same time.

In one or more embodiments of the invention, the robot joint further includes a first driving component and a second driving component. The motors include plural motors outputting power positively and plural motors outputting power negatively. The first driving component is connected to the digital signal processor and the motors outputting power positively. The second driving component is connected to the digital signal processor and the motors outputting power negatively.

In one or more embodiments of the invention, the digital signal processor includes a rotating speed commanding component for providing a rotating-speed command, a conversion component for converting the rotating-speed command into a first torque command and a second torque command, a first torque commanding component and a second torque commanding component. The first torque commanding component is used for receiving the first torque command and converting the first torque command to a first driving command to be transmitted to the first driving component, so as to control the motors outputting power positively. The second torque commanding component is used for receiving the second torque command and converting the second torque command to a second driving command to be transmitted to the second driving component, so as to control the motors outputting power negatively.

In one or more embodiments of the invention, when the first torque command and the second torque command are positive-going, the first driving command is obtained by dividing a sum of the first torque command and a predetermined retaining force by two, and the second driving command is obtained by dividing a negative predetermined retaining force by two.

In one or more embodiments of the invention, when the first torque command and the second torque command are negative-going, the second driving command is obtained by dividing a sum of the second torque command and a predetermined retaining force by two, and the first driving command is obtained by dividing a negative predetermined retaining force by two.

In one or more embodiments of the invention, the motors outputting power positively and the motors outputting power negatively use a common capacitor of a DC power. The motors outputting power positively and the motors outputting power negatively include plural positively working motors doing positive works to the hollow shaft, and plural negatively working motors doing negative works to the hollow shaft. The power fed back by the negatively working motors is stored in the capacitor of the DC power to be used by the positively working motors.

In one or more embodiments of the invention, the motors have a fixed electrical angle.

According to another aspect of the invention, a robot arm is provided. The robot arm includes a first robot joint, a functional structure, a second robot joint and a connection structure. The first robot joint is disposed at bottom, and includes a first hollow shaft, a first gear, plural first motors, plural second gears, a first encoder and a first digital signal processor. The first gear is fixed on the first hollow shaft. The first motors are arranged surrounding the first hollow shaft, wherein the first motors have a fixed electrical angle, and each of the first motors has a rotating shaft. The second gears are fixed on the rotating shaft and are engaged with the first gear, so that the first hollow shaft can be rotated with the second gears driven by the first motors. The first encoder is disposed at a side of one of the first motors opposite to the second gears, and a signal detected by the first encoder is sent to the first digital signal processor for driving the first motors. The first encoder and the first digital signal processor are disposed on the same plane surface. The second robot joint is connected to a functional structure. The second robot joint includes a second hollow shaft, a third gear, plural second motors, plural fourth gears, a second encoder and a second digital signal processor. The third gear is fixed on the second hollow shaft. The second motors are arranged surrounding the second hollow shaft, wherein the second motors have a fixed electrical angle, and each of the second motors has a rotating shaft. The fourth gears are fixed on the rotating shaft and are engaged with the third gear, so that the second hollow shaft can be rotated with the fourth gears driven by the second motors. The second encoder is disposed at a side of one of the second motors opposite to the fourth gears, and a signal detected by the second encoder is sent to the second digital signal processor for driving the second motors. The second encoder and the second digital signal processor are disposed on the same plane surface. The connection structure connects the first robot joint and the second robot joint, wherein the number of the first motors is greater than the number of the second motors.

In one or more embodiments of the invention, the number of teeth of the first gear is greater than that of each of the second gears, and the number of teeth of the third gear is greater than that of each of the fourth gears.

The hollow shaft is rotated with gears as driven by plural motors of the robot joint, so as to effectively improve an output torque force of the hollow shaft and reduce a speed reduction degree. When the robot joint is turned from a high-speed rotating state to a stop state, the motors can be further divided into the motors outputting power positively and the motors outputting power negatively, so as to reduce the influence caused by backlash when the robot joint is turned from a high-speed rotating state to a stop state. A user can adjust the number of motors according to different demands, i.e., changing the torque force and rotating speed of the hollow shaft of the robot joint. The encoder and the digital signal processor are disposed on the same plane surface to effectively reduce the arrangement space of the robot joint.

BRIEF DESCRIPTION OF THE DRAWINGS

In order to make the foregoing as well as other aspects, features, advantages, and embodiments of the invention more apparent, the accompanying drawings are described as follows:

FIGS. 6A and 6B respectively illustrate top views of different motor arrangement embodiments of the robot joint of the invention;

FIG. 8B is a schematic cross-sectional view of the second robot joint of FIG. 7.

DETAILED DESCRIPTION

The spirit of the invention will be described clearly through the drawings and the detailed description as follows. Any of those of ordinary skills in the art can make modifications and variations from the technology taught in the invention after understanding the embodiments of the invention, without departing from the sprite and scope of the invention.

Figure 1:
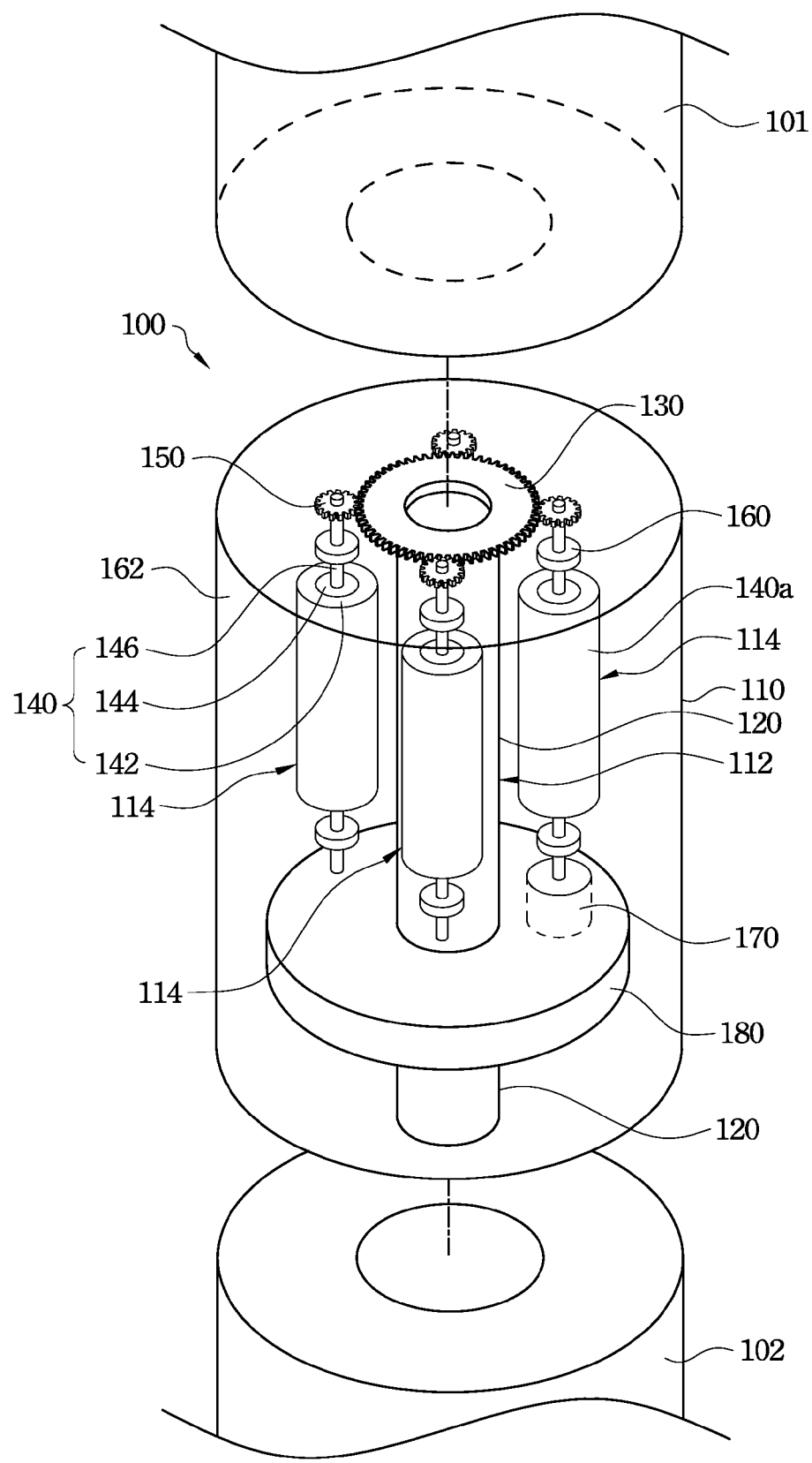
FIG. 1 is a perspective view of an embodiment of a robot joint of the invention.

Referring to FIG. 1, it is a perspective view of an embodiment of a robot joint of the invention. The robot joint 100 includes a shell 110, a hollow shaft 120, a first gear 130, plural motors 140 and plural second gears 150. The shell 110 includes a first hollow cave 112 for accommodating the hollow shaft 120 and plural second hollow caves 114 for accommodating the motors 140. The second hollow caves 114 are arranged surrounding the first hollow cave 112. The cross section shape of each of the first hollow cave 112 and the second hollow caves 114 is a circular shape, and the sectional area of the first hollow cave 112 is greater than that of each of the second hollow caves 114. The hollow shaft 120 is arranged in the first hollow cave 112, and the first gear 130 is fixed on the hollow shaft 120.

In an embodiment of the invention, two ends of the hollow shaft 120 are respectively connected with an upper arm 101 and a lower arm 102 of the robot arm, so that the upper arm 101 moves relative to the lower arm 102 as the hollow shaft 120 is rotated. Wires for supplying power and control signals of the robot arm may pass through the hollow shaft 120, but the invention is not limited to such a connection mode of upper and lower arms.

The plural motors 140 are arranged surrounding the hollow shaft 120, and these motors 140 are accommodated in the second hollow caves 114 one to one. More particularly, each of the motor 140 includes a stator 142 and a rotor 144. The stator 142 is fixed in each of the second hollow cave 114. The robot joint 100 further includes a shell cover 162 having a shaft bearing 160. The shell cover 162 is sleeved on the shell 110 to position the rotor 144 of the motor 140 through the shaft bearing 160 of the shell cover 162, so that the rotor 144 can be positioned and rotated in the stator 142.

The first gear 130 is fixed on the hollow shaft 120 and thus is motioned with the hollow shaft 120. The first gear 130 and the hollow shaft 120 can be molded as integrated. These second gears 150 are each fixed on the rotating shafts 146 of the rotors 144 of the motors 140, so that the second gears 150 are each motioned with the rotors 144. The number of teeth of the first gear 130 is greater than that of each of the second gears 150. The first gear 130 is further engaged with the second gears 150. The motors 140 are rotated to drive the second gears 140, which are engaged with the shaft 146 of the motors 140. Then the first gear 130 engaged with the second gears 140 is also rotated relative to the second gears 140 while the second gears 140 are driven by the motors 120. Therefore, the first gear 130 is rotated with the second gears 150, to further drive the hollow shaft 120 connected with the first gear 130 to be rotated.

In other words, for the robot joint 100, through such a design of the first gear 130 and the second gears 150, the hollow shaft 120 can be rotated as driven by the motors 140. In an embodiment, according to the design of the rotating speed of the motors and a gear ratio, the rotating speed of the second gears 150 is obtained by multiplying the rotating speed of the first gear 130 by the gear ratio of the second gears 150 to the first gear 130.

In this embodiment, the robot joint 100 further includes an encoder 170 arranged in one of these motors 140, for example underneath the motor 140*a*, i.e., at a side of the motor 140*a* opposite to the second gears 150. When the motors 140 (including the motor 140*a*) are installed into the shell 110, the angle of the rotor 144 of each motor 140 can be predetermined, so that the electrical angle is fixed among these motors 140. As such, the rotating speed and the current rotor angle of the motor 140*a* detected by a single encoder 170 can be converted into the rotating speeds and the current rotor angles of other motors 140.

The robot joint 100 further includes a digital signal processor 180 arranged in the shell 110. In order to reduce the entire thickness, the digital signal processor 180 is preferably at the same height with the encoder 170. For example, the digital signal processor 180 may have a hollow structure for receiving the encoder 170 or of a C type for getting out of the arrangement position of the encoder 170.

The signal detected by the encoder 170 is sent to the digital signal processor 180. Since a same electrical angle is predetermined among these motors 140, the digital signal processor 180 can generate respective driving signals according to the angle signal provided by the single encoder 170, so as to control all the motors 140. Moreover, if the digital signal processor 180 is combined with plural driving components, these motors 140 can be rotated in a form of more than two sets.

The robot joint 100 uses plural motors 140 to drive the hollow shaft 120, so as to effectively improve the torque force without overly reducing the rotating speed. For example, in conventional, the hollow shaft 120 is driven by the motor 140 one to one. If the gear ratio between the hollow shaft 120 and the motor 140 is 50, although the output torque force provided by the hollow shaft 120 is improved to 50 times of the output torque force provided by the motor 140, the rotating speed of the hollow shaft 120 becomes ⅟₅₀ of the rotating speed of the motor 140. In this embodiment, the four motors 140 are simultaneously engaged to the hollow shaft 120. When the four motors 140 simultaneously drive the hollow shaft 120 positively, and the gear ratio between the hollow shaft 120 and the motor 140 is 10, the torque force provided by the hollow shaft 120 is 40 times of torque force provided by each of the motors 140, but the rotating speed of the hollow shaft 120 is only reduced to ⅟₁₀ of the rotating speed of the motors 140.

The robot joint 100 is mostly applied in the robot arm to perform operations such as installation, transportation, spray painting and welding, so that the robot arm often needs to be stopped rapidly from moving/rotating at a high speed when approaching to a predetermined position. The motion mode of the motors 140 of the robot joint 100 can be designed to reduce the generation of gear backlash when the robot arm is turned from a high-speed moving state to a stop state. Through reduction of the generation of backlash, the accuracy of positioning the robot arm of the robot joint 100 is effectively improved. The following describes how to reduce the backlash in the robot joint 100 in details through embodiments.

In the following embodiments, the details of the robot joint stated in the embodiments above will not be described, and only the parts related to the motion mode of the motors are described.

Figure 2:
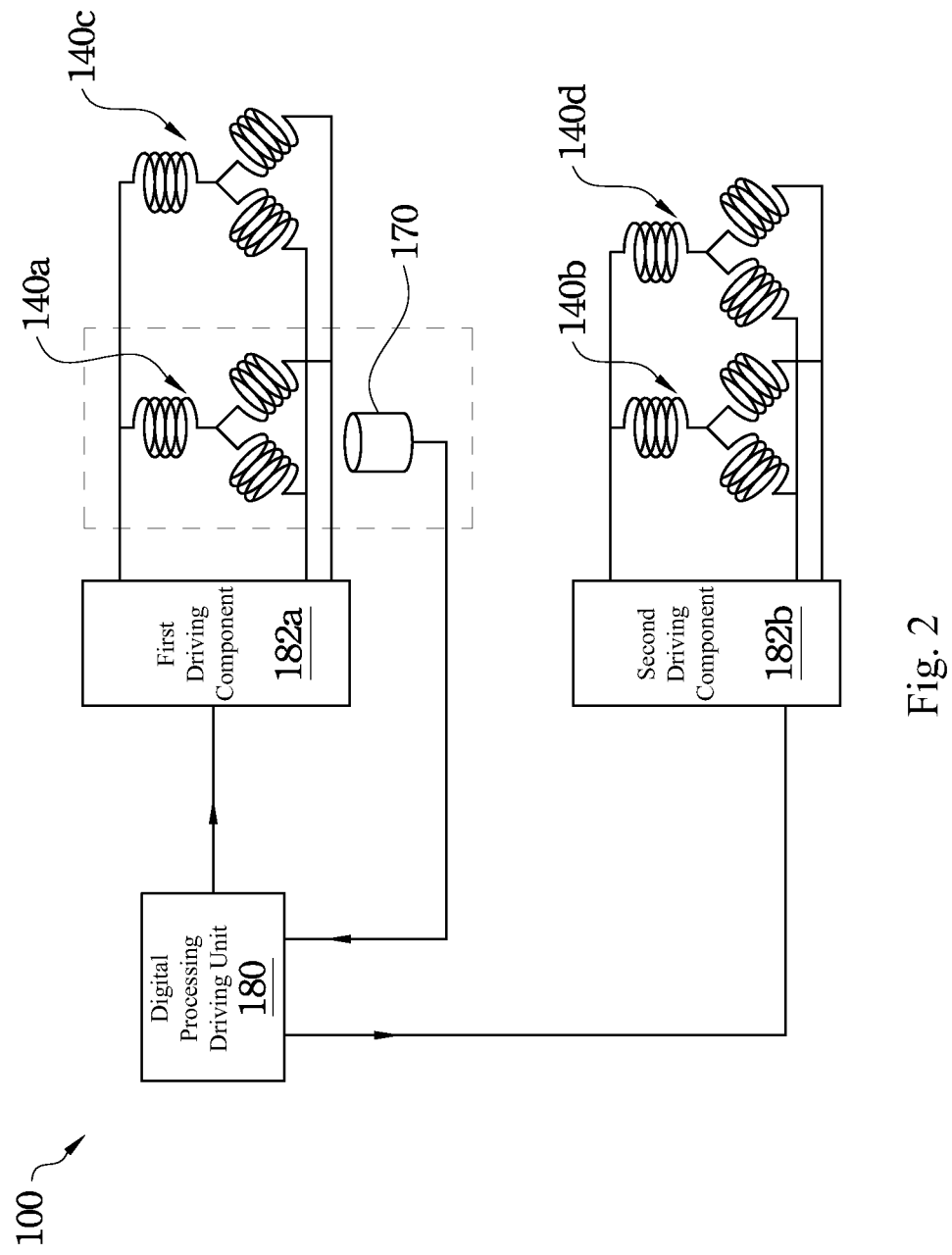
FIG. 2 is a schematic circuit diagram of another embodiment of a robot joint of the invention.

Referring to FIG. 2, it is a schematic circuit diagram of another embodiment of a robot joint of the invention. The robot joint 100 includes the digital signal processor 180, a first driving component 182*a*, a second driving component 182*b*, and four motors 140*a*, 140*b*, 140*c* and 140*d*. The first driving component 182*a* is connected to the digital signal processor 180 and the motors 140*a* and 140*c* connected in parallel with each other. The second driving component 182*b* is connected to the digital signal processor 180 and the motors 140*b* and 140*d* connected in parallel with each other. In an embodiment of the invention, the motors 140*a*, 140*b*, 140*c* and 140*d* are three-phase motors.

The encoder 170 is installed underneath the motor 140*a* for detecting the rotating speed and the rotor position of the motor 140*a*. The signal detected by the encoder 170 is sent to the digital signal processor 180, so that the digital signal processor 180 can drive other motors 140*b*, 140*c* and 140*d* having the same or corresponding electrical angle with the motor 140*a* according to the rotating speed and the rotor position of the motor 140*a* provided by the encoder 170. The driving signals sent by the digital signal processor 180 are transmitted respectively to the first driving component 182*a* and the second driving component 182*b*, and then the output of the motors 140*a* and 140*c* and the output of the motors 140*b* and 140*d* are respectively controlled through the first driving component 182*a* and the second driving component 182*b*, so that the motors 140*a* and 140*c* and the motors 140*b* and 140*d* can perform a same or different motion mode.

For example, it is supposed that the output command of the digital signal processor 180 is Tcmd; the commands sent to the motors outputting power positively 140*a* and 140*c* are Tma and Tmc; and the commands sent to the motors outputting power negatively 140*b* and 140*d* are Tmb and Tmd.

When Tcmd>0 (positive-going), $Tma=Tmc=(Tcmd+To)/2;$ $Tmb=Tmd=-To/2;$

When Tcmd<0 (negative-going), $Tma=Tmc=-To/2;$ $Tmb=Tmd=(Tcmd+To)/2$, wherein To is a predetermined retaining force.

When the torque command obtained corresponding to the rotating-speed command is positive, the positively working motors are required to add a predetermined retaining force to the torque command, and the negatively working motors are required to have a negative predetermined retaining force. The predetermined retaining force is used to enable the second gears 150 to clamp the first gear 130.

Figure 3:
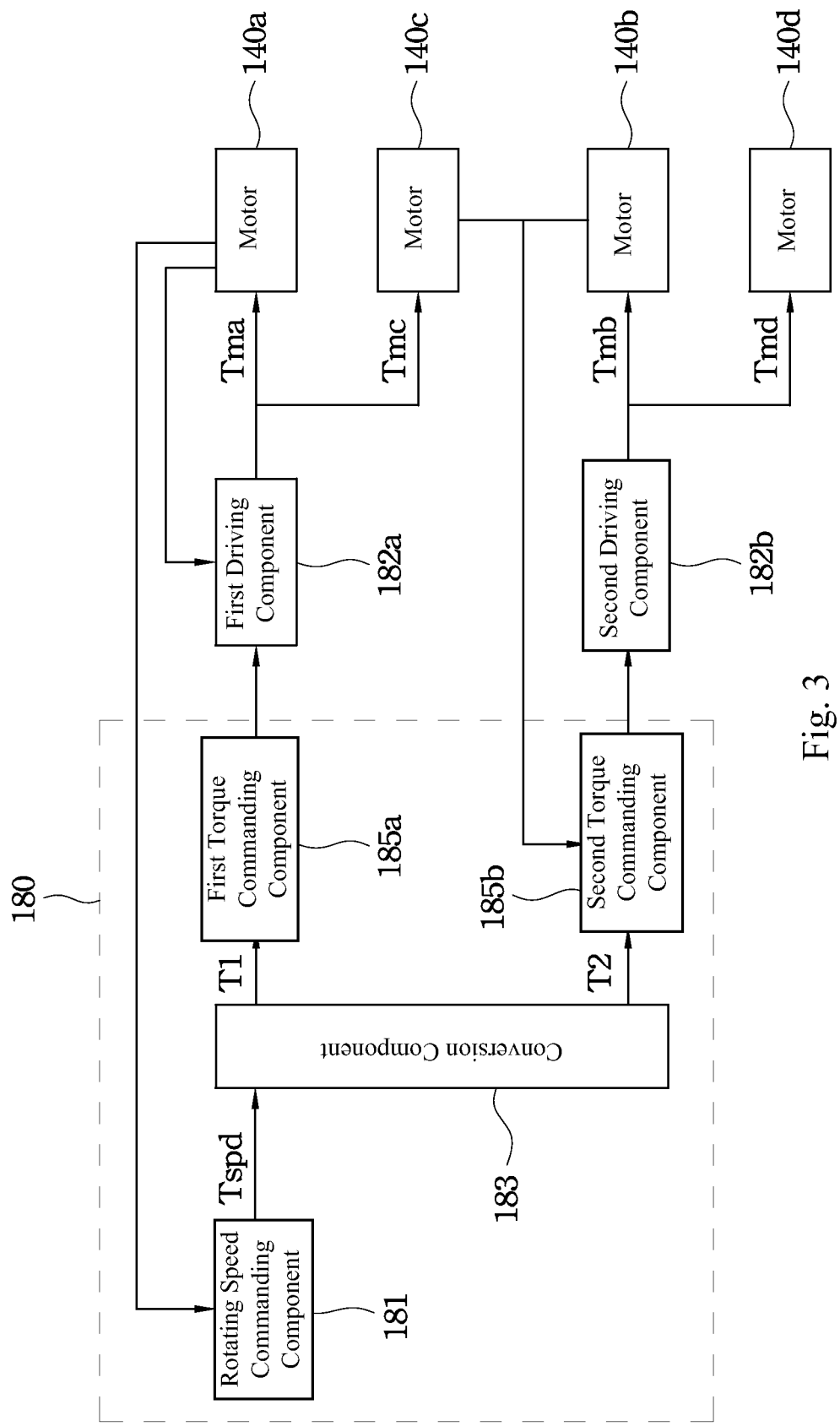
FIG. 3 is a schematic circuit diagram of another embodiment of a robot joint of the invention.

Referring to FIG. 3, it is a schematic circuit diagram of a further embodiment of a robot joint of the invention. The digital signal processor 180 includes a rotating speed commanding component 181, a conversion component 183, a first torque commanding component 185*a* and a second torque commanding component 185*b*. The rotating speed commanding component 181 can receive the current rotating speed of the motor 140*a* to provide a rotating-speed command Tspd. The rotating-speed command Tspd is transmitted to the conversion component 183, and the conversion component 183 converts the rotating-speed command Tspd into a first torque command T1 and a second torque command T2. After receiving the first torque command T1, the first torque commanding component 185*a* converts the first torque command T1 into a first driving signal and transmits the first driving signal to the first driving component 182*a*, so that the first driving component 182*a* drives the motors 140*a* and 140*c* according to the first driving signal. After receiving the second torque command T2, the second torque commanding component 185*b* converts the second torque command T2 into a second driving signal and transmits the second driving signal to the second driving component 182*b*, so that the second driving component 182*b* drives the motors 140*b* and 140d according to the second driving signal. The first driving signal and the second driving signal may be the same or different.

Figure 4:
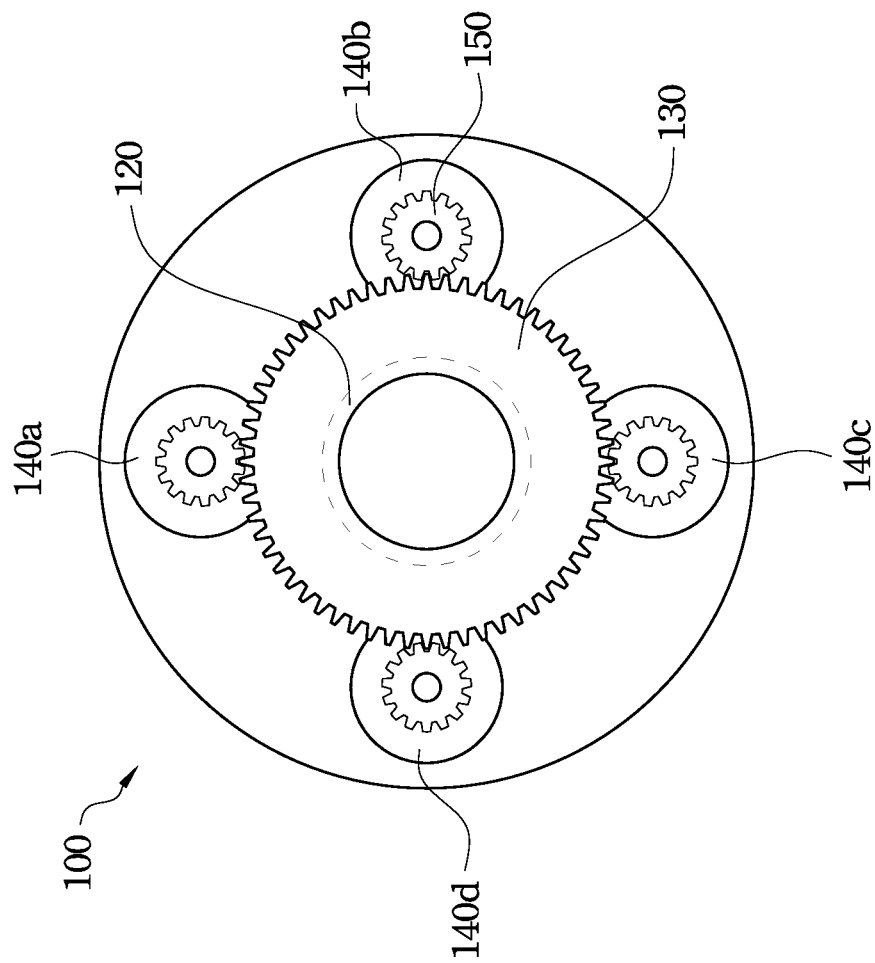
FIG. 4 is a top view of the robot joint of FIG. 2.

Referring both to FIGS. 2 and 4, wherein FIG. 4 is a top view of the robot joint 100 of FIG. 2. The robot joint 100 includes fourth motors 140a, 140b, 140c and 140d. The motors 140a, 140b, 140c and 140d are sequentially arranged surrounding the hollow shaft 120 according to a clockwise direction. The motors 140a, 140b, 140c and 140d are each connected with second gears 150, so as to be engaged with the first gear 130 on the hollow shaft 120, and thus the hollow shaft 120 is rotated as driven by the rotation of the motors 140a, 140b, 140c and 140d.

When the robot joint 100 is moving at a high speed, the motors 140a, 140b, 140c and 140d all output power positively or all output power negatively. When the speed of the robot joint 100 is slow down, in order to reduce generation of backlash, the motors 140a, 140b, 140c and 140d can be divided into two sets of motors, i.e., the motors outputting power positively and the motors outputting power negatively. In this embodiment, the motors 140a and 140c are the motors outputting power positively, and the motors 140b and 140d are the motors outputting power negatively. The digital signal processor 180 drives the motors outputting power positively 140a and 140c and the negatively working motors 140b and 140d respectively through two driving components 182a and 182b. As such, the second gears 150 which are motioned with the motors 140a, 140b, 140c and 140d have two set of different power outputting directions, and the first gear 130 is clamped through the two sets of second gears 150 with different power outputting directions, so as to reduce the influence caused by backlash.

Figure 5:
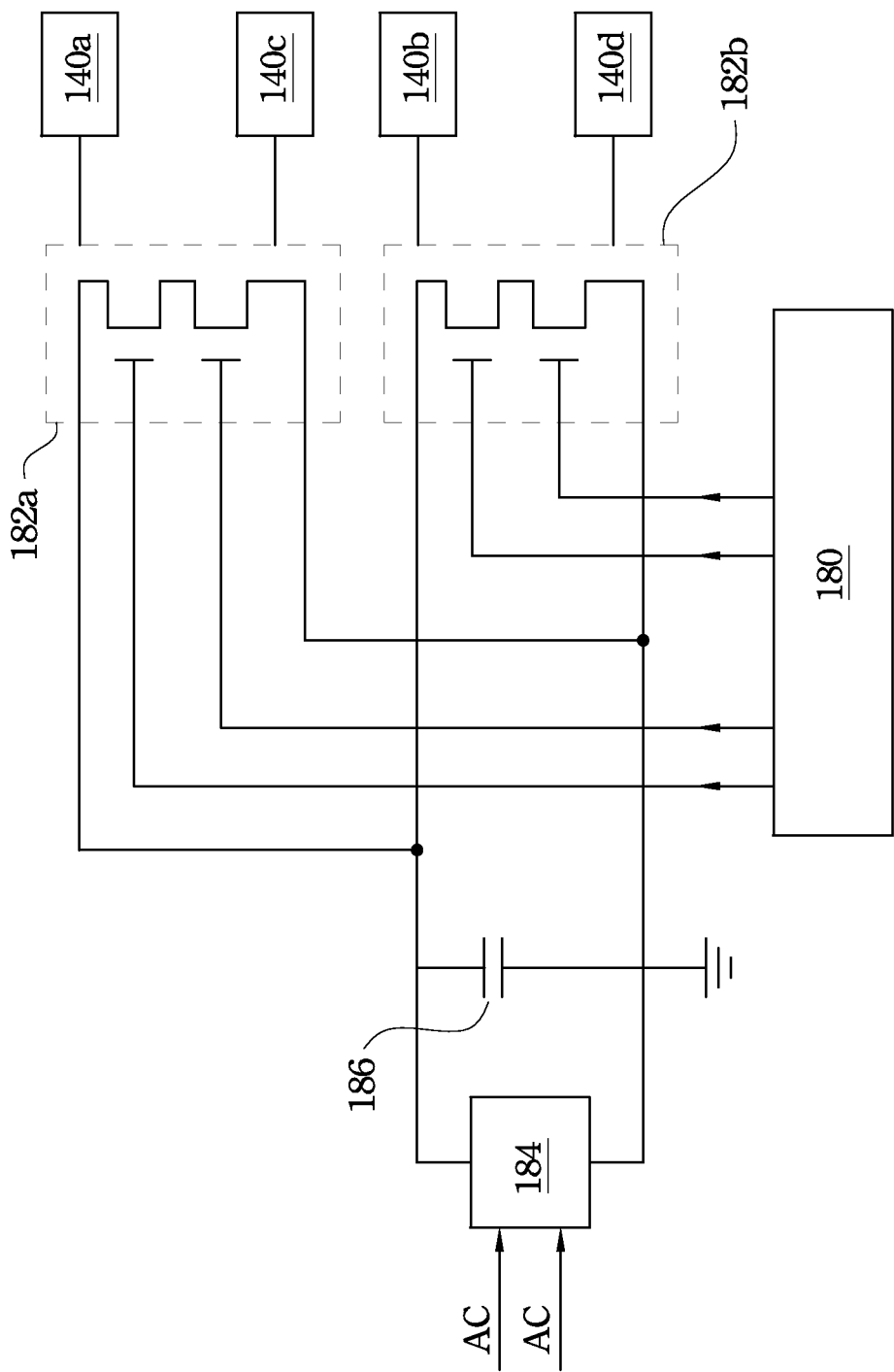
FIG. 5 is a schematic view of a driving circuit of a robot joint of the invention.

Additionally, referring also to FIG. 5, it is a schematic diagram of a driving circuit of a robot joint of the invention. The AC power entering a rectifier 184 is converted into a DC power for use, since the motors outputting power positively 140a and 140c and the motors outputting power negatively 140b and 140d use a common capacitor 186 of a DC power (DC-bus capacitor). Therefore, the motors outputting power positively 140a and 140c and the motors outputting power negatively 140b and 140d can perform power compensation through the capacitor 186 of the DC power. Specifically, the motors outputting power positively 140a and 140c and the motors outputting power negatively 140b and 140d can be further divided into positively working motors doing positive works to the hollow shaft 120 and the negatively working motors doing negative works to the hollow shaft 120 according to the rotation state of the hollow shaft 120, wherein the power fed back by the negatively working motors is stored in the capacitor 186 of the DC power to be used by the positively working motors.

It should be noted that, herein the referred positively working motors and negatively working motors may not directly correspond to the motors outputting power positively 140a and 140c and the motors outputting power negatively 140b and 140d, and it should be determined according to rotation relations of the hollow shaft 120 with the motors outputting power positively 140a and 140c and the motors outputting power negatively 140b and 140d. For example, if the hollow shaft 120 is rotated at a uniform speed or an accelerating speed clockwise, the motors outputting power positively 140a and 140c are positively working motors, and the motors outputting power negatively 140b and 140d are negatively working motors; if the hollow shaft 120 is rotated at a uniform speed or an accelerating speed anticlockwise, the motors outputting power positively 140a and 140c are negatively working motors, and the motors outputting power negatively 140b and 140d are positively working motors; if the hollow shaft 120 is turned from rotating clockwise to rotating anticlockwise through reducing the speed, then during the direction conversion process, the motors outputting power positively 140a and 140c are negatively working motors, and the motors outputting power negatively 140b and 140d are positively working motors; and if the hollow shaft 120 is turned from rotating anticlockwise to rotating clockwise through reducing the speed, then during the direction conversion process, the motors outputting power positively 140a and 140c are positively working motors, and the motors outputting power negatively 140b and 140d are negatively working motors.

It should be noted that in this embodiment the positively working motors 140a and 140c and the negatively working motors 140b and 140d are arranged with intervals, but the positively working motors 140a and 140c and the negatively working motors 140b and 140d can be arranged randomly, as long as the number of the positively working motors is the same as that of the negatively working motors.

Referring both to FIGS. 3 and 4, when the first driving component 182a and the second driving component 182b respectively drive the positively working motors 140a and 140c and the negatively working motors 140b and 140d, if the first torque command and the second torque command are positive, the first driving command is obtained by dividing a sum of the first torque command and the predetermined retaining force by two, and the second driving command is obtained by dividing the negative predetermined retaining force by two. If the first torque command and second torque command are negative, the second driving command is obtained by dividing a sum of the second torque command and the predetermined retaining force by two, and the first driving command is obtained by dividing the negative predetermined retaining force by two.

Figure 6B:
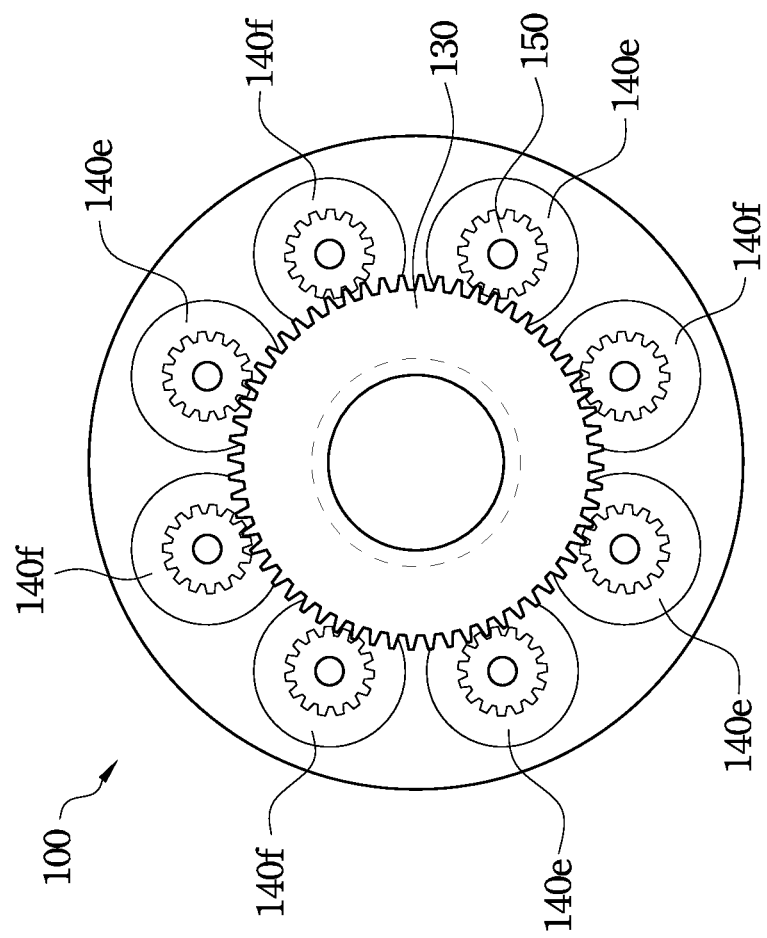

Referring to FIGS. 6A and 6B, they respectively illustrate top views of different motor arrangement embodiments of the robot joint of the invention. In FIG. 6A, the number of the positively working motors 140e is the same with that of the negatively working motors 140f, both three. The positively working motors 140e are arranged at one side of the hollow shaft 120, and the negatively working motors 140f are arranged at the other side of the hollow shaft 120. In FIG. 6B, the number of the positively working motors 140e is the same with that of the negatively working motors 140f, both four. The positively working motors 140e and the negatively working motors 140f are arranged randomly surrounding the hollow shaft 120.

Figure 7:
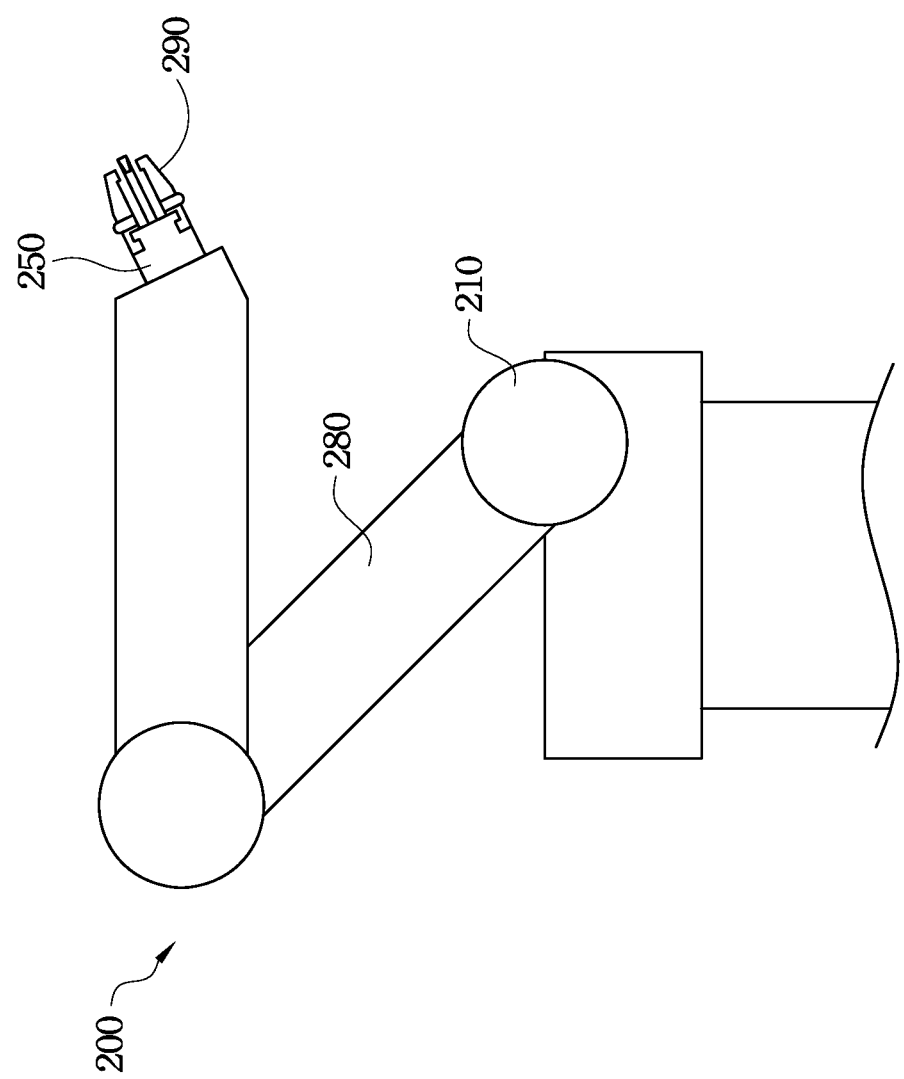
FIG. 7 is a schematic outside view of an embodiment of a robot arm applying the robot joint of the invention.

Referring to FIG. 7, it is a schematic outside view of an embodiment of a robot arm applying the robot joint of the invention. The robot arm 200 at least includes a first robot joint 210, a second robot joint 250 and a connection structure 280. The connection structure 280 is used to connect the first robot joint 210 and the second robot joint 250. The robot arm 200 is installed on a base, and the end of the robot arm 200 may be connected with a functional structure 290, such as a holding jaw or a welding torch. The first robot joint 210 is arranged at the bottom of the robot arm 200, and the second robot joint 250 is connected with the functional structure 290. The first robot joint 210 is positioned at the bottom, so that a large torque force should be provided thereto, and the second robot joint 250 is adjacent to the end, so that the dimension thereof should be small. In order to meet requirements of different arrangement positions, the first robot joint 210 and the second robot joint 250 are preferably to have different specifications.

Figure 8A:
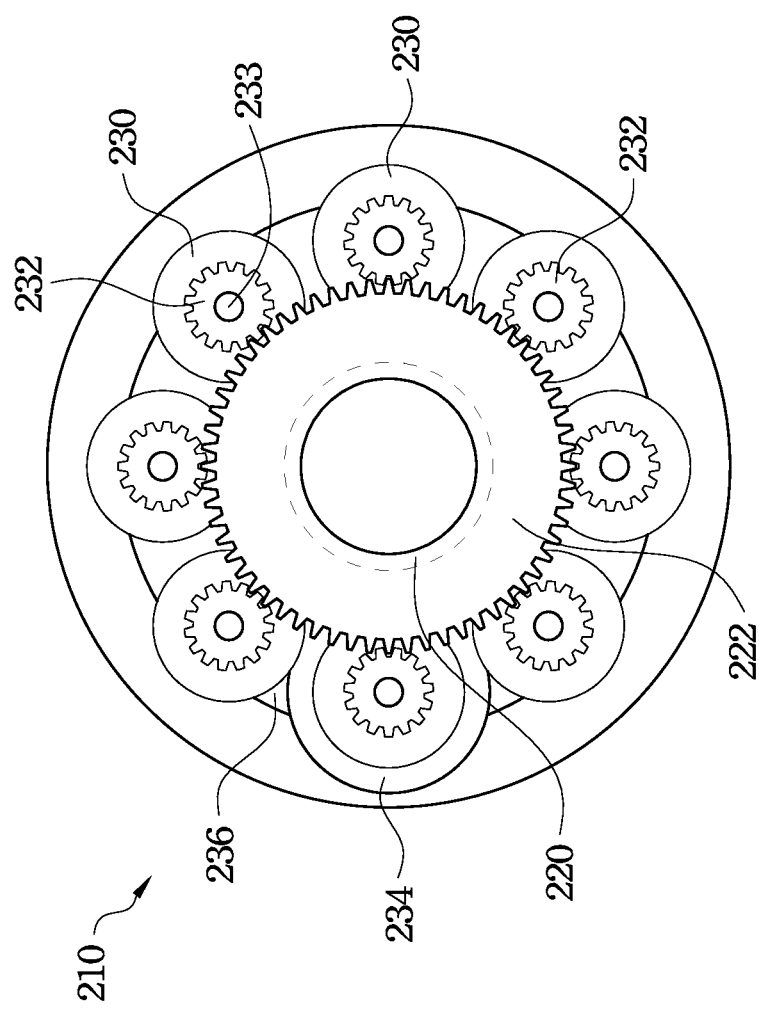
FIG. 8A is a schematic cross-sectional view of the first robot joint of FIG. 7.

Referring to FIGS. 8A and 8B, FIG. 8A is a schematic cross-sectional view of the first robot joint 210 of FIG. 7 and FIG. 8B is a schematic cross-sectional view of the second robot joint 250 of FIG. 7.

In FIG. 8A, the first robot joint 210 arranged at the bottom includes a first hollow shaft 220, a first gear 222, plural first motors 230, plural second gears 232, a first encoder 234 and a first digital signal processor 236. The first gear 222 is fixed on the first hollow shaft 220. The first motors 230 are arranged surrounding the first hollow shaft 220. The first motors 230 have a fixed electrical angle, and each of the first motors 230 includes a rotating shaft 233. The number of teeth of the first gear 222 is greater than that of each of the second gears 232. The second gears 232 are fixed on the rotating shafts 233 of the motors, and are engaged with the first gear 222, so as to drive the first hollow shaft 220 to rotate through the first motors 230. The first encoder 234 is disposed at a side of one of the first motors 230 opposite to the second gears 232. The first digital signal processor 236 is disposed at a side of the first motors 230 opposite to the second gears 232, and the signal detected by the first encoder 234 is sent to the first digital signal processor 236.

In FIG. 8B, the second robot joint 250 arranged at the end includes a second hollow shaft 260, a third gear 262, plural second motors 270, plural fourth gears 272, a second encoder 274 and a second digital signal processor 276. The third gear 262 is fixed on the second hollow shaft 260. The second motor 270 is arranged surrounding the second hollow shaft 260. The second motors 270 have a fixed electrical angle, and each of the second motors 270 includes a rotating shaft 273. The number of teeth of the third gear 262 is greater than that of each of the fourth gears 272. The fourth gears 272 are fixed on the rotating shafts 273 of the motors, and are engaged with the third gear 262, so as to drive the second hollow shaft 260 to rotate through the second motors 270. The second encoder 274 is disposed at a side of one of the second motors 270 opposite to the fourth gears 272. The second digital signal processor 276 is disposed at a side of the second motors 270 opposite to the fourth gears 272, and the signal detected by the second encoder 274 is sent to the second digital signal processor 276.

As described above, the first robot joint 210 disposed at the bottom and the second robot joint 250 disposed at the end have different requirements. The first robot joint 210 disposed at the bottom needs large torque force and is allowed to have a large dimension, so that various first motors 230 can be disposed in the first robot joint 210. As such, along with the increase of the gear ratio, the torque force of the first robot joint 210 is also improved, which can meet the requirement of low rotating speed and high torque force of the first robot joint 210 disposed at the bottom.

In contrast, the second robot joint 250 disposed at the end needs to have characteristics of light weight and small dimension, so that the number of second motors 270 disposed in the second robot joint 250 is small, which means the number of the first motors 230 is greater than that of the second motors 270. Since the number of the second motors 270 disposed in the second robot joint 250 is small, naturally the second robot joint 250 has the characteristics of light weight and low torque force, which just meets the design requirement of the robot arm.

The first motors 230 and the second motors 270 may be motors of the same dimension, so as to achieve the aim of normalizing the components and further reducing the cost, which is convenient for assembling and disassembling. The first motors 230 or the second motors 270 are arranged surrounding the first hollow shaft 220 or the second hollow shaft 260, to form a circular array of motors. A user can adjust the number of motors in the circular array of motors according to actual demands, so as to achieve functions of adjusting the rotating speed and the torque force output.

It can be seen from the aforementioned embodiments of the invention that invention has the following application advantages. The hollow shaft is rotated with gears as driven by plural motors of the robot joint, so as to effectively improve an output torque force of the hollow shaft and reduce a speed reduction degree. When the robot joint is turned from a high-speed rotating state to a stopped state, the motors can be further divided into the motors outputting power positively and the motors outputting power negatively, so as to reduce the influence on the back lash when the robot joint is turned from a high-speed rotating state to a stopped state. A user can adjust the number of motors according to different requirements of arrangement positions of the robot joint to change the torque force and rotating speed of the hollow shaft of the robot joint. Furthermore, the encoder and the digital signal processor are disposed on the same plane surface to effectively reduce the arrangement space of the robot joint.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A robot joint utilized in a robot arm, comprising:
   a hollow shaft;
   a first gear fixed on the hollow shaft;
   plural motors arranged surrounding the hollow shaft, each of the motors has a rotating shaft;
   plural second gears fixed on the rotating shafts and engaged with the first gear, wherein the hollow shaft is rotated with the second gears as driven by the motors;
   an encoder, wherein the second gears and the encoders are disposed at opposite sides of the motor; and
   a digital signal processor, wherein the signal detected by the encoder is sent to the digital signal processor, and the motors are driven through the signal, wherein the digital signal processor and the encoder are disposed on the same plane surface.

2. The robot joint of claim 1, wherein the motors all output power positively at the same time, or all output power negatively at the same time.

3. The robot joint of claim 1, further comprising a first driving component and a second driving component, wherein the motors comprise plural motors outputting power positively and plural motors outputting power negatively, the first driving component is connected to the digital signal processor and the motors outputting power positively, and the second driving component is connected to the digital signal processor and the motors outputting power negatively.

4. The robot joint of claim 3, wherein the digital signal processor comprises:
   a rotating speed commanding component for providing a rotating-speed command;
   a conversion component for converting the rotating-speed command into a first torque command and a second torque command;
   a first torque commanding component for receiving the first torque command and converting the first torque command into a first driving command to be transmitted to the first driving component, so as to control the motors outputting power positively; and a second torque commanding component for receiving the second torque command and converting the second torque command into a second driving command to be transmitted to the second driving component, so as to control the motors outputting power negatively.

5. The robot joint of claim 4, wherein when the first torque command and the second torque command are positive, the first driving command is obtained by dividing a sum of the first torque command and a predetermined retaining force by two, and the second driving command is obtained by dividing the negative predetermined retaining force by two.

6. The robot joint of claim 4, wherein when the first torque command and the second torque command are negative, the second driving command is obtained by dividing a sum of the second torque command and a predetermined retaining force by two, and the first driving command is obtained by dividing the negative predetermined retaining force by two.

7. The robot joint of claim 4, wherein the motors outputting power positively and the motors outputting power negatively use a common capacitor of a DC power, the motors outputting power positively and the motors outputting power negatively comprise plural positively working motors doing positive works to the hollow shaft, and plural negatively working motors doing negative works to the hollow shaft, and the power fed back by the negatively working motors is stored in the capacitor of the DC power to be used by the positively working motors.

8. The robot joint of claim 1, wherein the motors have a fixed electrical angle.

9. The robot joint of claim 1, wherein the digital signal processor has a hollow structure for receiving the encoder.

10. The robot joint of claim 1, wherein the digital signal processor is of a C type for getting out of an arrangement position of the encoder.

11. A robot arm, comprising:
a first robot joint disposed at a bottom, comprising:
  a first hollow shaft;
  a first gear fixed on the first hollow shaft;
  plural first motors arranged surrounding the first hollow shaft, wherein the first motors have a fixed electrical angle, and each of the first motors has a rotating shaft;
  plural second gears fixed on the rotating shafts and engaged with the first gear, wherein the first hollow shaft is rotated with the second gears as driven by the first motors;
  a first encoder disposed at one side of the first motors opposite to the second gears; and
  a first digital signal processor, wherein the signal detected by the first encoder is sent to the first digital signal processor, and the first motors are driven through the signal, wherein the first digital signal processor and the first encoder are disposed on the same plane surface;
a functional structure;
a second robot joint connected to the functional structure, comprising:
  a second hollow shaft;
  a third gear fixed on the second hollow shaft;
  plural second motors arranged surrounding the second hollow shaft, wherein the second motors have a fixed electrical angle, and each of the second motors has a rotating shaft;
  plural fourth gears fixed on the rotating shafts and engaged with the third gear, wherein the second hollow shaft is rotated with the fourth gears as driven by the second motors;
  an second encoder disposed at one side of the second motors opposite to the fourth gears; and
  a second digital signal processor, wherein the signal detected by the second encoder is sent to the second digital signal processor, and the second motors are driven through the signal, wherein the second digital signal processor and the second encoder are disposed on the same plane surface; and
a connection structure connecting the first robot joint and the second robot joint, wherein the number of the first motors is greater than the number of the second motors.

12. The robot arm of claim 11, wherein the number of teeth of the first gear is greater than that of each of the second gears, and the number of teeth of the third gear is greater than that of each of the fourth gears.

* * * * *